United States Patent [19]

Tsuchiya

[11] 4,433,562
[45] Feb. 28, 1984

[54] STEERING SHAFT LOCKING DEVICE

[75] Inventor: Takaoki Tsuchiya, Nagoya, Japan

[73] Assignee: Kabushiki Kaisha Tokai Rika Denki Seisakusho, Aichi, Japan

[21] Appl. No.: 356,645

[22] Filed: Mar. 10, 1982

[30] Foreign Application Priority Data

Mar. 12, 1981 [JP] Japan ............................. 56-34499[U]

[51] Int. Cl.³ .......................................... B60R 25/02
[52] U.S. Cl. ........................................ 70/186; 70/252
[58] Field of Search ................. 70/252, 185, 186, 182, 70/183, 184, 255, 261; 180/271

[56] References Cited

U.S. PATENT DOCUMENTS

| | | | |
|---|---|---|---|
| 3,400,563 | 9/1968 | Lempke | 70/252 |
| 3,569,930 | 3/1971 | Hirama | 70/252 |
| 3,570,286 | 3/1971 | Rohrbough | 70/185 |
| 3,680,335 | 8/1972 | Onishi | 70/252 |
| 3,859,828 | 1/1975 | Ibuka et al. | 70/252 |
| 4,232,538 | 11/1980 | Detloff, Jr. | 70/239 |
| 4,250,976 | 2/1981 | Mochida | 70/252 |
| 4,313,519 | 2/1982 | Lipschutz | 70/252 |

*Primary Examiner*—Robert L. Wolfe
*Attorney, Agent, or Firm*—Wenderoth, Lind & Ponack

[57] ABSTRACT

A steering shaft locking device including a sleeve in which a steering shaft is rotatably accommodated, a housing so that a lock member may be projectable for its engagement with the steering shaft in response to rotation of a rotary member of a cylinder lock, and a rotary ring formed with a boss portion, which is rotatably provided in the sleeve so as to enclose an outer circumference of the steering shaft at a position of projection of the lock member into and of its retraction from the sleeve.

4 Claims, 7 Drawing Figures

STEERING SHAFT LOCKING DEVICE

BACKGROUND OF THE INVENTION

1. Field of the Invention

The present invention generally relates to a locking device and more particularly, to a steering shaft locking device for use in a motor vehicle and the like, which is provided mainly for the purpose of theft prevention of the motor vehicle.

2. Description of the Prior Art

Conventionally, various steering shaft locking devices have been proposed. In one of such known steering shaft locking devices, there is provided an engaging member which is arranged to be engageable with an engaging slot formed in one face of a lock member in response to insertion of a key into a rotary member of a cylinder lock and to be projectable into the engaging slot by an urging force of a spring. The lock member is engaged with or projectable for its engagement with a steering shaft at a "Lock" position of the lock member, whereby the lock member is retracted in response to rotation of the rotary member in the direction toward an "On" position of the rotary member through the key so that the engaging member projectable into the engaging slot may be fitted into the engaging slot through a probeable operation of the engaging member.

However, the conventional steering shaft locking devices as described above are generally complicated in structures, thus resulting in increased manufacturing cost.

SUMMARY OF THE INVENTION

Accordingly, an essential object of the present invention is to provide an improved steering shaft locking device for use in a motor vehicle and the like, which is simple in structure, with substantial elimination of the disadvantages inherent in conventional steering shaft locking devices of this kind.

Another important object of the present invention is to provide an improved steering shaft locking device of the above-described type which is highly reliable in actual use and suitable for mass production at low cost.

In accomplishing these and other objects according to one preferred embodiment of the present invention, there is provided an improved steering shaft locking device for use in a motor vehicle and the like, including a sleeve formed with an aperture, in which a steering shaft is rotatably accommodated, and a housing accommodating a cylinder lock, a lock member, etc. therein so that said lock member may be projectable for its engagement with said steering shaft in response to rotation of a rotary member of said cylinder lock in the direction toward a "Lock" position of said rotary member. The steering shaft locking device comprises:

a rotary ring formed with an opening and a boss portion, which is rotatably provided inside said sleeve so as to enclose an outer circumference of said steering shaft at a position of projection of said lock member into said sleeve and at a position of its retraction from said sleeve;

said boss portion being projected out of said sleeve through said aperture of said sleeve;

said lock member being selectively prevented from being projected into said steering shaft through said opening so as to unlock said steering shaft, and being projected into said steering shaft through said opening so as to lock said steering shaft when said rotary member is disposed at a regular angular position and a rotational angular position, respectively;

a spring for urging said rotary ring in the direction toward the regular angular position of said rotary ring so as to prevent said lock member from being projected into said steering shaft through said opening of said rotary ring so that said steering shaft may be unlocked, which is connected with said boss portion of said rotary ring; and a wire connected, at one end thereof, with said boss portion and connected, at the other end, either with a seat of said motor vehicle, whose top face is caused to selectively move downwards and upwards when a driver takes said seat and leaves said seat, respectively, or with a door etc. of said motor vehicle, arranged to be opened and closed;

whereby when the driver leaves said seat or opens said door, etc., said rotary ring is rotated from the regular angular position to the rotational angular position through said wire against the urging force of said spring so that said lock member may be projected into said steering shaft through said opening of said rotary member so as to lock said steering shaft.

In accordance with the present invention, the rotary ring is rotatably provided, only through a partial modification of the sleeve, in the sleeve so that the opening of the rotary ring may be displaced from the lock member so as to unlock the steering shaft at the regular angular position of the rotary member with the steering shaft being rotatably accommodated in the sleeve, whereby the steering shaft locking device has been made simple in structure, highly reliable in actual use, and suitable for mass production at low cost.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE PREFERRED EMBODIMENT

Figure 1:
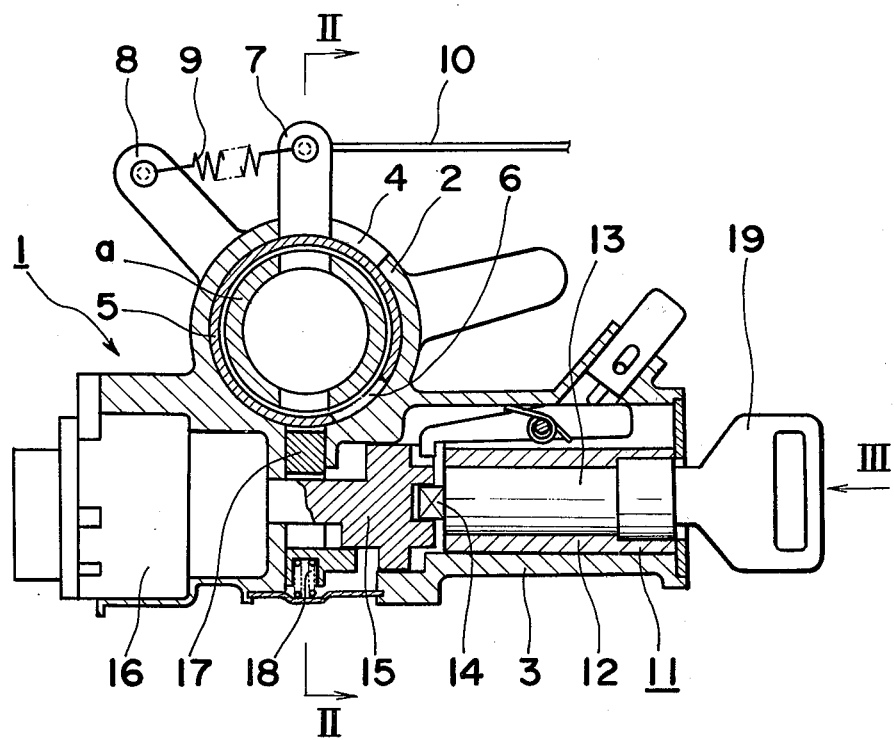
FIG. 1 is a cross-sectional view of a steering shaft locking device for use in a motor vehicle and the like according to one preferred embodiment of the present invention.
Figure 2:
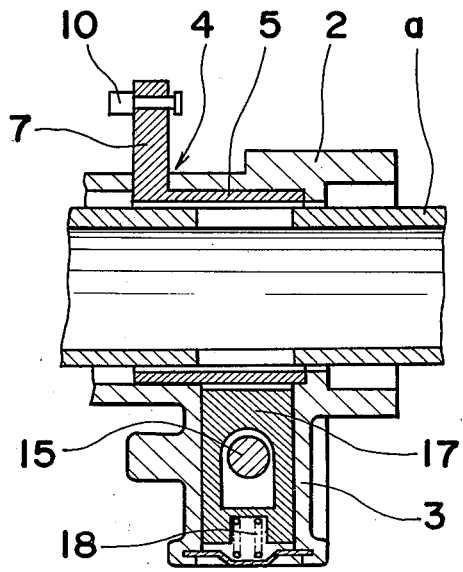
FIG. 2 is a side sectional view taken along the line II—II in FIG. 1.

Referring now to the drawings, there is shown in FIGS. 1 and 2, a casing 1 of a steering shaft locking device for use in a motor vehicle and the like according to one preferred embodiment of the present invention, formed, for example, by plastic molding or die casting, including a sleeve 2 in which a steering shaft a is rotatably accommodated, and a housing 3 which intersects with the sleeve 2. The sleeve 2 is formed with an aperture 4 and an arm 8. A rotary ring 5 in which the steering shaft a is loosely provided is rotatably fitted into the sleeve 2 and is formed with an opening 6. The rotary ring 5 is further formed with a boss portion 7 projecting upwards out of the sleeve 2 through the aperture 4 of the sleeve 2. A spring 9 is connected, at one end thereof, with the boss portion 7 of the rotary ring 5 and connected, at the other end, with the arm 8 of the sleeve 2 so that the boss portion 7 may be brought into contact with one side of the aperture 4 so as to dispose the rotary ring 5 at a regular angular position for unlocking the steering shaft a. Furthermore, a wire 10 is connected, at one end thereof, with the boss portion 7 of the rotary ring 5. It is so arranged that the rotary ring 5 is rotated, through traction of the wire 10, to a rotational angular position for locking the steering shaft a so that the boss portion 7 may be brought into contact with the other side of the aperture 4 as shown in FIG. 4.

Meanwhile, the housing 3 accommodates therein, in a known manner, a cylinder lock 11 having a stationary member 12 into which a rotary member 13 is fitted, with a key 19 being inserted into the rotary member 13, a second rotary member 15 in association with a square projection 14 of the rotary member 13, an ignition switch 16 for rotating a movable contact holder through the second rotary member 15, and a lock member 17 which is controlled by the second rotary member 15 so as to be selectively projected into the sleeve 2 through the opening 6 of the rotary ring 5 by an urging force of a compression spring 18 and to be retracted from the sleeve 2.

Figure 3:
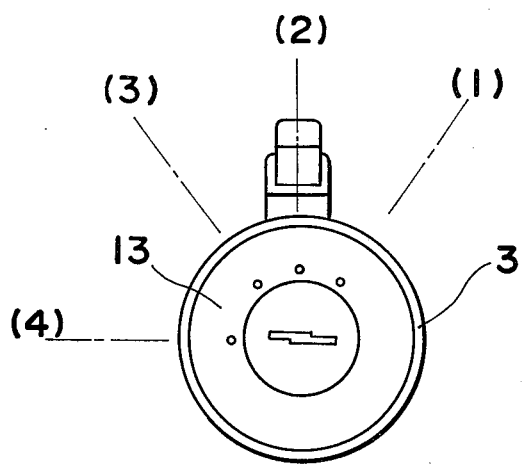
FIG. 3 is a side elevational view as observed in the direction of the arrow III in FIG. 1.

As shown in FIG. 3, it is so arranged that the rotary member 13 is movable together with the key 19 of FIG. 1 to "Start" (1), "On" (2), "Acc." (3), and "Lock" positions (4) and the key 19 can be inserted into or withdrawn from the rotary member 13 only when the key 19 is in the "Lock" position (4).

Figure 4:
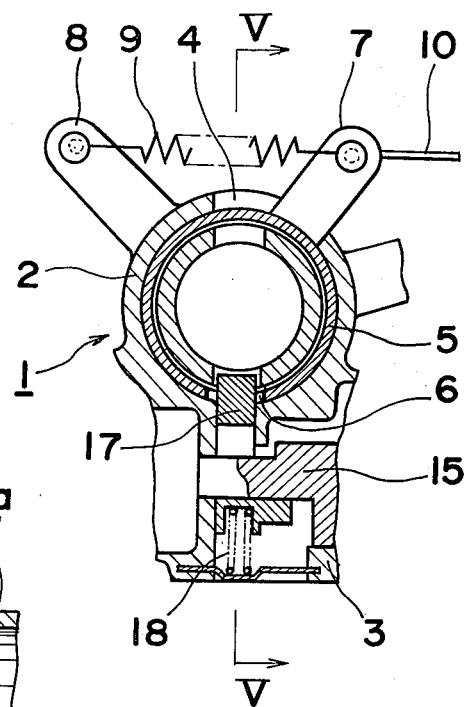
FIG. 4 is a view similar to FIG. 1, particularly showing rotation of a rotary ring of the steering shaft locking device of FIG. 1 to a rotational angular position thereof.
Figure 5:
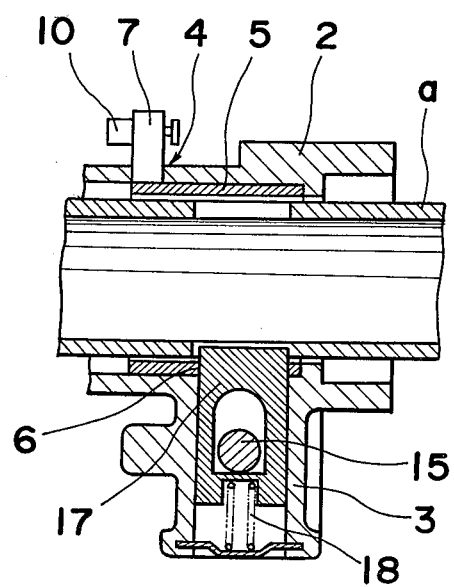
FIG. 5 is a side sectional view taken along the line V—V in FIG. 4.

It is to be noted that the lock member 17 is selectively prevented from being projected into the steering shaft a through the opening 6 so as to unlock the steering shaft a, and is projected into the steering shaft a through the opening 6 so as to lock the steering shaft a when the rotary ring 5 is disposed at the regular angular position shown in FIGS. 1 and 2, and the rotational angular position shown in FIGS. 4 and 5, respectively.

Figure 6:
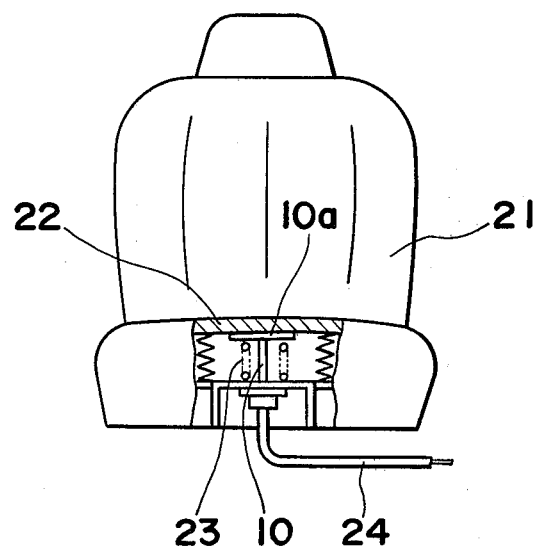
FIG. 6 is a front elevational view partly in section of a seat of the motor vehicle, with which one end of a wire of the steering shaft locking device of FIG. 1 may be connected.
Figure 7:
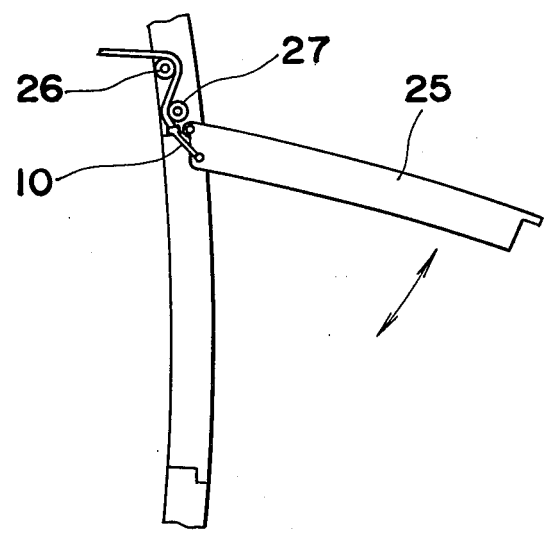
FIG. 7 is a top plan view of a door of the motor vehicle, with which one end of the wire may be connected.

A wire 10, shown in FIGS. 6 and 7, having its one end connected with the boss portion 7 of the rotary ring 5 is connected, at the other end thereof, either with a seat 21 of the motor vehicle, whose top face is caused to selectively move downwards and upwards when a driver takes the seat 21 and leaves the seat, respectively, or with a door 25, etc. of the motor vehicle arranged to be opened and closed.

In the case where the wire 10 is connected with the seat 21, as shown in FIG. 6, one end of an outer wire 24 is connected with a fixed portion of the seat 21, a flange 10a formed at the other end of the wire 10 is pressure welded to an undersurface of a seat sheathing 22 and a spring 23 in contact, at one end thereof, with the one end of the outer wire 24 is provided so as to be engaged, at the other end, with the flange 10a, whereby, at the same time when the seat occupant leaves the seat 21, the rotary ring 5 is rotated from the regular angular position shown in FIG. 1 to the rotational angular position shown in FIG. 4 through traction of the wire 10 due to stretch of the spring 23.

Meanwhile, in the case where the wire 10 is connected with the door 25, as shown in FIG. 7, the wire 10 is connected with the door 25 through guide rollers 26 and 27, etc., whereby, when the door 25 is opened, the rotary ring 5 is rotated from the regular angular position shown in FIG. 1 to the rotational angular position shown in FIG. 4 through traction of the wire 10.

As is clear from the foregoing description, in accordance with the present invention, as shown in FIGS. 3-5, the lock member 17, projectable into the sleeve 2 having the steering shaft a rotatably inserted therethrough when the rotary member 13 of the cylinder lock 11 is brought to the "Lock" position (4) of FIG. 3, is prevented from being projected into the sleeve 2 by the rotary ring 5. The wire 10 connected, at one end thereof, with the boss portion 7 outside the sleeve 2, is connected, at its other end, with the seat 21 or the door 25, etc. Accordingly, when the seat occupant leaves the seat 21 or opens the door 25, etc., the rotary ring 5 is rotated from the regular angular position to the rotational angular position by the wire 10 through the boss portion 7 so that the lock member 17 may be projected into the steering shaft a through the opening 6 of the rotary ring 5. Mounting of the rotary ring 5 can be effected through a slight modification of the sleeve 2. Furthermore, since projection of the boss portion 7 out of the aperture 4 of the sleeve 2, mounting of the spring 9 for urging the rotary ring 5 in the direction toward the regular angular position, and connection of the wire 10 for tracting the rotary ring 5 in the direction toward the rotational angular position against the urging force of the spring 9 can be effected on the sleeve 2 or adjacent to the outer circumference of the sleeve 2, the steering shaft locking device can be made simple in structure. Furthermore, in accordance with the present invention, the lock member 17 is prevented from being projected into the sleeve 2 so as to unlock the steering shaft a so that free steering of the motor vehicle can be affected until the seat occupant leaves the seat 21 or opens the door 25, etc. even if the key 19 is withdrawn from the rotary member 13 of the cylinder lock 11 after the rotary member 13 has been rotated to the "Lock" position (4).

Although the present invention has been fully described by way of example with reference to the accompanying drawings, it is to be noted that various changes and modifications will be apparent to those skilled in the art. Therefore, unless such changes and modifications depart from the scope of the present invention, they should be construed as included therein.

What is claimed is:

1. A steering shaft locking device including a sleeve in which a steering shaft is rotatably accommodated, and a housing so that a lock member may be projectable for its engagement with said steering shaft in response to rotation of a rotary member of a cylinder lock with an axis of said sleeve intersecting with that of said housing, said steering shaft locking device comprising:

a rotary ring formed with a boss portion, which is rotatably provided in said sleeve so as to enclose an outer circumference of said steering shaft at a position of projection of said lock member into and of its retraction from said sleeve;

said boss portion being projected out of said sleeve;

a spring for urging said rotary ring in the direction towards a regular angular position for unlocking said steering shaft;

said boss portion and said spring being mounted on said rotary ring; and a wire connected, at one end thereof, with said boss portion and connected, at the other end, either with a seat whose top face is caused to selectively move downwards and upwards when a driver takes said seat and leaves said seat, respectively or with a door, etc. arranged to be opened and closed.

2. A steering shaft locking device as claimed in claim 1, wherein said sleeve is formed with an aperture for allowing said boss portion to project out of said sleeve therethrough.

3. A steering shaft locking device as claimed in claim 2, wherein said rotary ring is formed with an opening, whereby, when the driver leaves said seat or opens said door, etc., said rotary ring is rotated from said regular angular position for unlocking said steering shaft to a rotational angular position for locking said steering shaft through said wire so that said lock member may be projected into said steering shaft through said opening.

4. A steering shaft locking device as claimed in claim 3, further including a spring means for urging said lock member to project into said steering shaft through said opening of said rotary ring.

* * * * *